(12) United States Patent
Mengibar et al.

(10) Patent No.: US 8,494,853 B1
(45) Date of Patent: Jul. 23, 2013

(54) METHODS AND SYSTEMS FOR PROVIDING SPEECH RECOGNITION SYSTEMS BASED ON SPEECH RECORDINGS LOGS

(71) Applicants: Pedro J. Moreno Mengibar, Jersey City, NJ (US); Eugene Weinstein, New York, NY (US)

(72) Inventors: Pedro J. Moreno Mengibar, Jersey City, NJ (US); Eugene Weinstein, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/734,296

(22) Filed: Jan. 4, 2013

(51) Int. Cl.
*G10L 15/26* (2006.01)

(52) U.S. Cl.
USPC ........ 704/235; 704/270.1; 704/270; 704/233; 704/257

(58) Field of Classification Search
USPC .............. 704/235, 270.1, 270, 251, 231, 277, 704/257, 244, 255, 240, 260, 275, 233; 434/167, 434/308; 715/234
See application file for complete search history.

(56) References Cited

U.S. PATENT DOCUMENTS

| 5,500,920 | A   | * | 3/1996  | Kupiec .................... 704/270.1 |
| 6,418,431 | B1  | * | 7/2002  | Mahajan et al. ...................... 1/1 |
| 6,985,861 | B2  | * | 1/2006  | Van Thong et al. ........... 704/254 |
| 7,236,931 | B2  | * | 6/2007  | He et al. ........................ 704/235 |
| 7,606,714 | B2  | * | 10/2009 | Williams et al. .............. 704/275 |
| 7,756,708 | B2  | * | 7/2010  | Cohen et al. ................... 704/244 |
| 7,761,298 | B1  | * | 7/2010  | Pereira et al. ................. 704/257 |
| 8,374,866 | B2  | * | 2/2013  | Weinstein et al. ............. 704/243 |
| 2003/0110035 | A1 | * | 6/2003  | Thong et al. .................. 704/254 |
| 2008/0130699 | A1 | * | 6/2008  | Ma et al. ..................... 372/50.12 |
| 2013/0006623 | A1 | * | 1/2013  | Chelba et al. ................. 704/233 |
| 2013/0132084 | A1 | * | 5/2013  | Stonehocker et al. ........ 704/244 |

* cited by examiner

*Primary Examiner* — Vijay B Chawan
(74) *Attorney, Agent, or Firm* — McDonnell Boehnen Hulbert & Berghoff LLP

(57) ABSTRACT

Examples of methods and systems for providing speech recognition systems based on speech recordings logs are described. In some examples, a method may be performed by a computing device within a system to generate modified data logs to use as a training data set for an acoustic model for a particular language. A device may receive one or more data logs that comprise at least one or more recordings of spoken queries and transcribe the recordings. Based on comparisons, the device may identify any transcriptions that may be indicative of noise and may remove those transcriptions indicative of noise from the data logs. Further, the device may remove unwanted transcriptions from the data logs and the device may provide the modified data logs as a training data set to one or more acoustic models for particular languages.

20 Claims, 6 Drawing Sheets

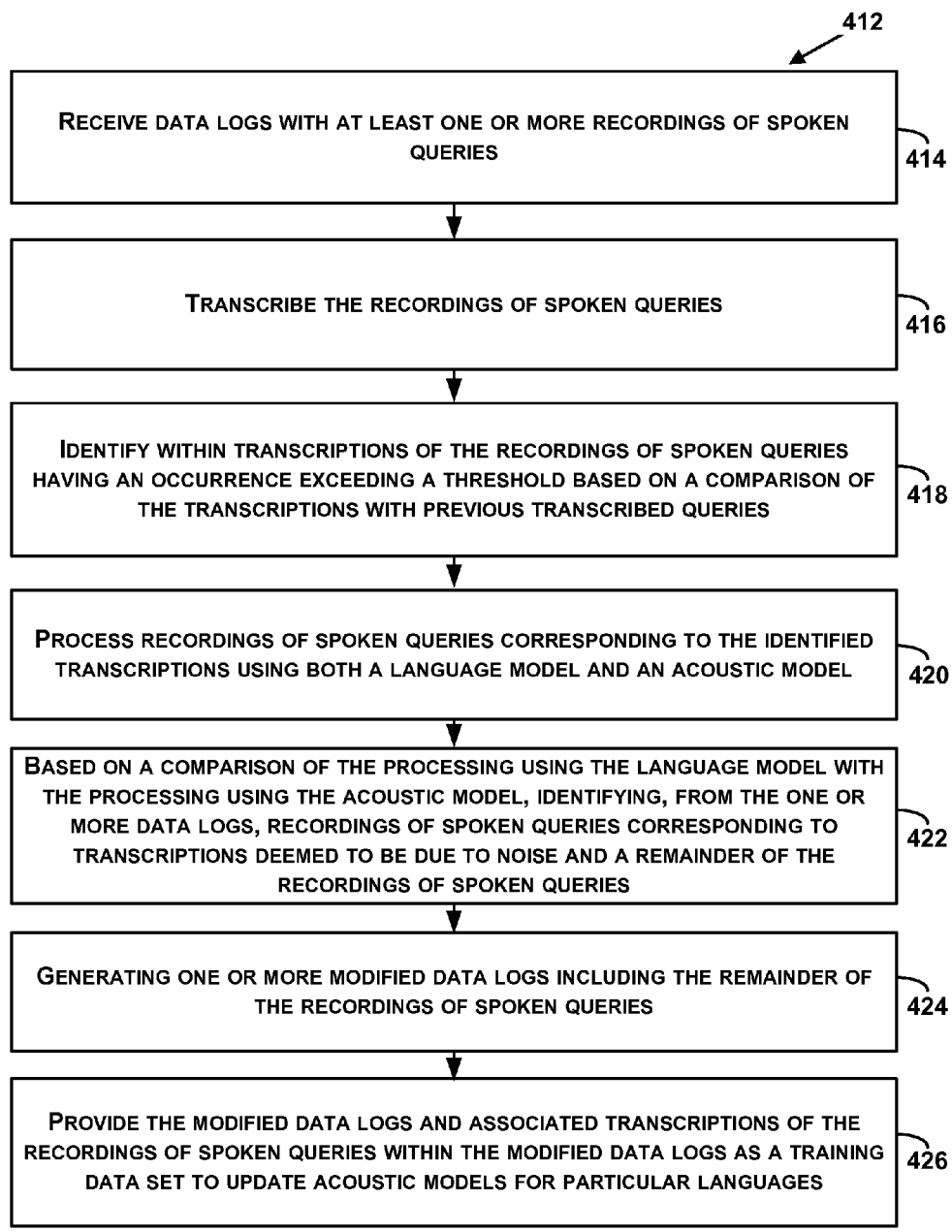

METHODS AND SYSTEMS FOR PROVIDING SPEECH RECOGNITION SYSTEMS BASED ON SPEECH RECORDINGS LOGS

BACKGROUND

Computing devices include various combinations of hardware and software which enable the user to, among other things, interact with a computing system. One example of a modern user-interface is "voice control" that may allow a user to provide speech data to a speech recognition module of a computing system. The data may be received, translated into text, and processed by the speech recognition module, and may ultimately be used by the computing system as a basis for executing certain computing functions. Speech recognition modules continue to be more useful for users who need free use of their hands and control of a computing device simultaneously. For example, a doctor performing surgery may take advantage of a speech recognition module in order to execute commands on a computing device while operating on a patient with his or her hands.

A speech recognition system may need to learn how users articulate various sounds of speeches through processing large databases of recordings of speech queries (referred to as utterances). However, a speech recognition system may encounter problems trying to understand a user's input. For example, a speech recognition module may receive inputs from different users who have various vocal pitches, pronounce words differently, and emphasize different portions of words, etc. In addition, a speech recognition system may detect background noises, the wind, or other interruptions that may be confused for input from the user. Speech recognition systems may have to overcome these obstacles along with others in order to properly function.

SUMMARY

In one aspect, a method is described. The method may comprise receiving one or more data logs, and the one or more data logs comprise at least one or more recordings of spoken queries. The method also may comprise transcribing the one or more recordings of spoken queries, and identifying within transcriptions of the one or more recordings of spoken queries transcriptions having an occurrence exceeding a threshold. The threshold may be based on a comparison of the transcriptions with previous transcribed queries. The method may further comprise processing recordings of spoken queries corresponding to the identified transcriptions using both a language model and an acoustic model and based on a comparison of the processing using the language model with the processing using the acoustic model, identifying, from the one or more data logs, one or more recordings corresponding to transcriptions deemed to be due to noise. The method may further comprise generating one or more modified data logs containing recordings of spoken queries and providing the one or more modified data logs and associated transcriptions of the one or more recordings of spoken queries within the one or more modified data logs as training data set to update one or more acoustic models for particular languages.

In another aspect, a computer readable medium having stored thereon instructions that, when executed by a computing device, cause the computing device to perform functions is described. The functions may comprise receiving one or more data logs, and the one or more data logs comprise at least one or more recordings of spoken queries. The functions also may comprise transcribing the one or more recordings of spoken queries, and identifying within transcriptions of the one or more recordings of spoken queries transcriptions having an occurrence exceeding a threshold. The threshold may be based on a comparison of the transcriptions with previous transcribed queries. The functions may further comprise processing recordings of spoken queries corresponding to the identified transcriptions using both a language model and an acoustic model, and based on a comparison of the processing using the language model with the processing using the acoustic model, identifying, from the one or more data logs, one or more recordings corresponding to transcriptions deemed to be due to noise. The functions may further comprise generating one or more modified data logs containing recordings of spoken queries and providing the one or more modified data logs and associated transcriptions of the one or more recordings of spoken queries within the one or more modified data logs as training data set to update one or more acoustic models for particular languages.

In still another aspect, a system is described. The system may comprise at least one processor and data storage comprising program instructions executable by the at least one processor to cause the at least one processor to perform functions comprising receiving one or more data logs, and the one or more data logs comprise at least one or more recordings of spoken queries. The functions may further comprise transcribing the one or more recordings of spoken queries and identifying within transcriptions of the one or more recordings of spoken queries transcriptions having an occurrence exceeding a threshold and the threshold is based on a comparison of the transcriptions with previous transcribed queries. The functions may also comprise processing recordings of spoken queries corresponding to the identified transcriptions using both a language model and an acoustic model and based on a comparison of the processing using the language model with the processing using the acoustic model, identifying, from the one or more data logs, one or more recordings corresponding to transcriptions deemed to be due to noise. The functions may further comprise generating one or more modified data logs containing recordings of spoken queries and providing the one or more modified data logs and associated transcriptions of the one or more recordings of spoken queries within the one or more modified data logs as training data set to update one or more acoustic models for particular languages.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4A-4B depicts flow charts of example methods for providing modified data logs.

DETAILED DESCRIPTION

Figure 1:
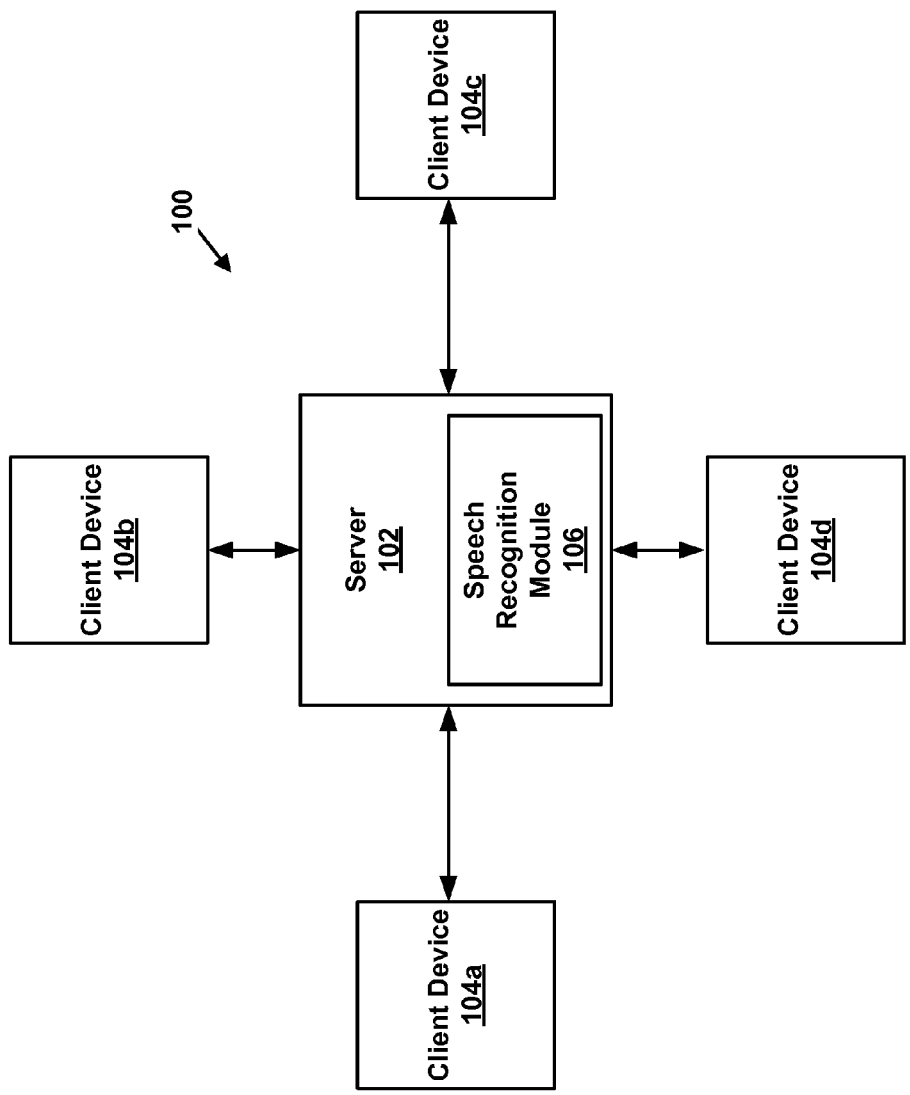
FIG. 1 illustrates an example communication system in which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The following detailed description may disclose methods and systems for creating and improving speech recognition systems from speech recordings logs. In one aspect, a system with one or more entities may be configured to perform the methods described herein. The system may be configured to receive one or more data logs comprising one or more recordings of spoken queries from a client device (e.g., a mobile device). The client device may communicate with the entities within the system and may be configured to receive a verbal input from one or more users of the client device. The system may be configured with a speech recognition module that may transcribe the recordings of spoken queries and identify the transcriptions that occur more frequently than others. In one example, the speech recognition module may identify transcriptions that exceed a threshold frequency. One or more entities within the system may process spoken queries corresponding to identified transcriptions using both a language model and acoustic model to make a comparison. Based on this comparison, a system may identify and remove any data logs containing spoken queries that the server determines to be indicative of noise. In some examples, after removing the data logs containing noise, the modified data logs and associated transcriptions of the spoken queries may be used as a training data set to update acoustic models for particular languages.

In another example, additional heuristic-based filtering may be applied to the modified data logs to further increase the accuracy for training data. Additional rule-based parameters may further remove unwanted spoken queries or apply different algorithms to further refine the data logs into accurate training data sets. For example, the speech recognition module may be configured to remove any transcription of a recording of spoken queries that contains an uniform resource locator (URL) or a numerical sequence, and thus, may determine more accurate transcriptions overall. The modified data logs containing the determined accurate transcriptions may be used to update one or more acoustic models without depending on human intervention.

Systems, methods, and devices in which examples may be implemented will now be described in greater detail. In general, described methods may be implemented by various types of computing devices or components of the devices. In one example, a system may include one or more servers, which may receive information from and provide information to a client device, such as a mobile phone. However, the described methods may also be implemented by other computing devices, such as a personal computer, a wearable computing device, or a mobile device, among others. Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

FIG. 1 illustrates an example communication system 100 in which methods for creating and improving speech recognition systems based on speech recordings logs may be performed. In the example illustrated by FIG. 1, a server 102 may communicate with one or more client devices. The sever 102 may be configured to communicate with a client device 104 via a wireless and/or wired interfaces. The server 102 may comprise a speech recognition module 106.

In the example illustrated by FIG. 1, the server 102 may be any entity configured to perform the method and computing device functions described herein. The server 102 may additionally be configured to perform other methods and executions. In one example, the server 102 may be composed of multiple entities. The server 102 may be capable of communicating with multiple client devices simultaneously. In some examples, the server 102 may be or include a cloud interface. In addition, the server 102 may communicate with other servers or serve as a link between other devices.

FIG. 1 shows client devices 104a-104d, which may be any type of computing device or transmitter including a laptop computer, a mobile telephone, wearable computing device, or tablet computing device, etc. In some instances, the client device 104a may be composed of one or more entities configured to perform the methods and functions described herein. Further, the client device 104a may include a user interface, a communication interface, a processor, and data storage comprising instructions executable by the processor for carrying out one or more functions relating to the data sent to, or received by, the server 102. The client device 104a may also contain different interfaces. For example, the user interface may include buttons, a touchscreen, a microphone, and/or any other elements for receiving inputs, as well as one or more speakers, one or more displays, and/or any other elements for communicating outputs. In some examples, the server 102 and client devices 104a-104d may take on a variety of forms. In addition, the client devices 104a-104d and the server 102 may communicate through various means, such sharing a network or each may communicate through independent networks.

In one example of communication, a client device, such as client device 104a, may receive some form of input from a user and relay the input to the server 102. The client device 104a may send the input via a wireless and/or wired link and may repeat this process until receiving a response from the server 102. In addition, the server 102 may send information to the client device 104a or another device via a wireless and/or wired link and may wait for a response.

The server 102 may use the speech recognition module 106 to transcribe the verbal input into an understandable format for a computing device and relay that format back to one or more of the client devices 104a-104d. The speech recognition module 106 may be composed of one or more entities that may receive incoming data, and transcribe the incoming data in a manner so as to enable a computing device to understand the transcription of the incoming data. The speech recognition module 106 may receive various types of inputs and convert the inputs into one or more forms that a computing device may use, such as client device 104a. In some examples, one or more client devices 104a-104d may contain a speech recognition module that may be capable of being updated by the speech recognition module 106. Other examples may exist as well.

The speech recognition module 106 may include one or more applications and may use one or more algorithms. The speech recognition module 106 may be configured to include voice user interfaces such as search, call routing, voice dialing, simple data entry, document preparation, or speech-to-text processing, for example. In addition, the speech recognition module 106 may be configured to recognize different inputs of data. In one example, the speech recognition module 106 may use one or more analog-to-digital converters to digitalize any data received. The speech recognition module 106 may be a separate entity from the server 102, or may be coupled to the server 102. The speech recognition module 106 may be configured to remove unwanted noise and apply filters to received digital sounds, such as recordings of spoken queries. In another example, the speech recognition module 106 may be configured to operate using the Hidden Markov Model (HMM) or neural network recognition, or a hybrid of these types. Other examples are possible.

In one example, one or more client devices 104a-104d may provide one or more data logs to the server 102. The one or more data logs may each contain one or more recordings of spoken queries. In addition, a client device, such as client device 104a, may capture the one or more recordings of spoken queries from a user and send the recordings in a data log to the server 102 in real-time. In another example, one or more client devices 104a-104d may store the one or more recordings in a data log and proceed to send that data log at a defined time. The client devices 104a-104d may use a speech recognition module associated with each client device to convert the recordings of spoken queries into understandable information for the processor of the client device 104 to execute.

In some examples, the server 102 may convert received data logs to text and parse the text to identify one or more functions to perform. Additionally, a client device, such as client device 104a, may be configured to convert the audio to text locally and then send the text information to the server 102 to be parsed. In yet another example, one or more client devices 104a-104d may be configured to parse the text locally, determine one or more functions to perform, execute the one or more functions, and send information indicative of the parsing, determining, and executing to the server 102. The client device may also send to the server 102 a response determination indicative of an acknowledgement (e.g., a user acknowledgement) in response to the one or more determined functions. In still another example, one or more client devices, such as client device 104a, may receive a textual input from a user of the client device 104a rather than a verbal input. The client device 104a may then parse the text input and send information to the server 102. Other examples are also possible.

Figure 2:
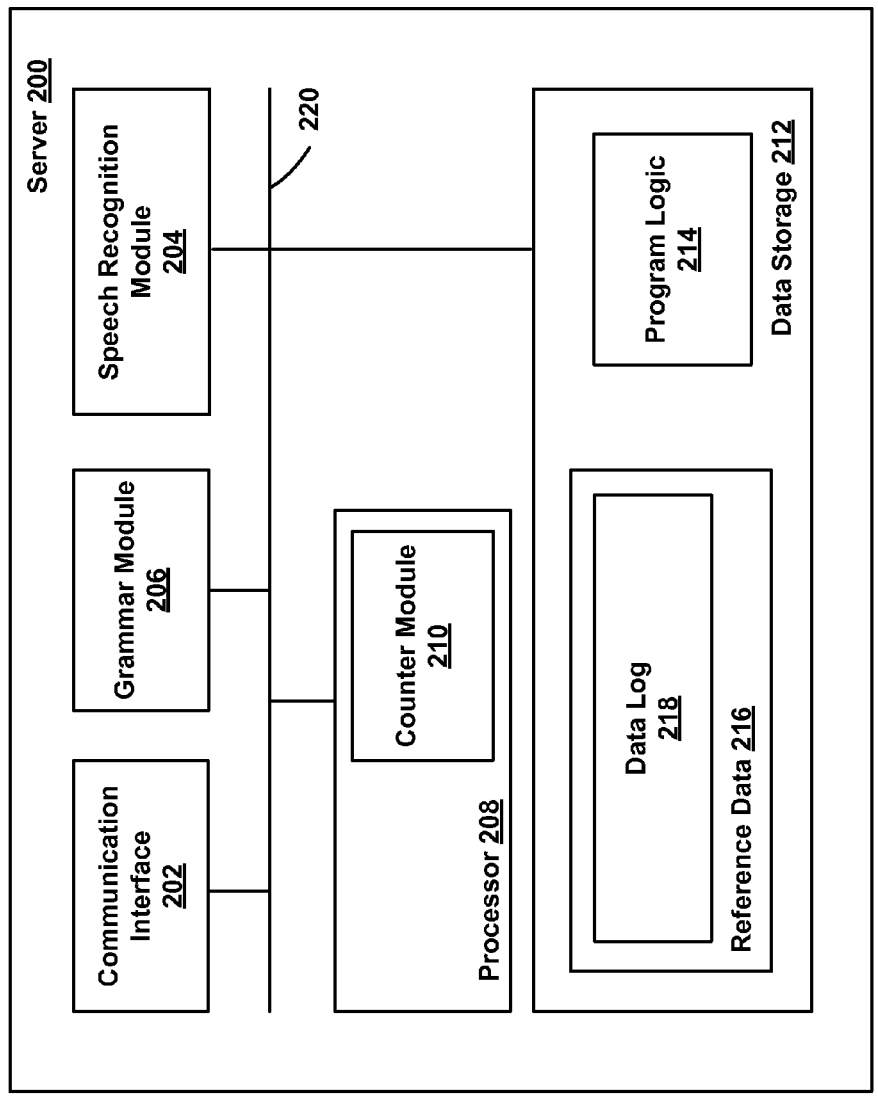
FIG. 2 illustrates a schematic drawing of an example computing device.

FIG. 2 illustrates an example for a server 200. Sever 200 may represent one or more entities in a system similar to the one represented in FIG. 1. In some examples, server 200 may be composed of one or more components, or compile multiple devices. In addition, components of server 200 may be distributed across multiple servers. In the example illustrated by FIG. 2, the components are shown and described as part of server 200. In addition, server 200 may be one or more computing devices, a cloud, or similar entity that may be configured to perform the functions described herein.

The server 200 may include a communication interface 202, a speech recognition module 204, a grammar module 206, a processor 208, and data storage 212. In the example, the components are linked by a communication link 220. The server 200 may be configured to include various hardware components to allow communication within the server 200 and between the server 200 and another computing device (not shown). For example, the hardware components may include transmitters, receivers, and antennas, etc.

In the example illustrated by FIG. 2, the communication interface 202 may enable communication with one or more devices, such as a mobile phone, computing device, another server, etc. The communication interface 202 may be configured to send/receive input data between one or more computing devices. In addition, the communication interface 202 may maintain and manage records of data received and sent by the server 200. In one example of maintaining and managing records of data, one or more records of data may be maintained by one or more components of the server 200. The communication interface 202 may also be configured to operate in real-time. Other examples of communication interface 202 may exist as well.

FIG. 2 illustrates a speech recognition module 204 within server 200. In some examples, the speech recognition module 204 may be a separate component from the server 200 and may communicate with the server 200. Further, the speech recognition module 204 may link with the communication interface 202 and other components of server 200 through the communication link 220. In another example, the speech recognition module 204 may be configured within communication interface 202 or other components.

In some example methods, the speech recognition module 204 may be configured to operate as a text recognition module. Similarly, the speech recognition module 204 may be configured to receive different types of inputs, such as a verbal or textual input, from various devices. In some example methods, the speech recognition module 204 may be configured to use one or more algorithms to process inputs, such as identifying one or more grammar-based textual patterns, which may include one or more grammars. The speech recognition module 204 may be configured to use grammars according to the speech recognition grammar specification (SRGS). Grammars may be produced and/or stored by a grammar module 206 as shown in FIG. 2. A grammar may include a set of word patterns which may provide the speech recognition module 204 with information for determining meanings behind input from a user. In some examples, speech or text recognition may be performed by a client device. Grammars may be produced and/or stored at the client device as well.

In some examples, the speech recognition module 204 may be a speaker-dependent module or a speaker-independent module, or a combination of the two types. As discussed above, the speech recognition module 204 may be configured to operate as a Hidden Markov Model (HMM), dynamic time warping (DTW) based speech recognition module, a neural network, or a hybrid of these systems.

In the example illustrated by FIG. 2, the server 200 may contain a processor 208. The processor 208 may be configured to execute the various functions and methods described herein. In addition, the processor 208 may execute other functions or methods. The processor 208 may be configured to carry out the instructions of one or more computer programs. In some examples, the processor 208 may include a counter module 210. The counter module 210 may be configured to determine a counter value indicative of a number of occurrences of a correlation between an input received from the client device and previously stored inputs. The counter module 210 may be configured to increment the counter value based on at least in part of the number of occurrences. In some examples, one or more functions of the server 200 may depend or be inhibited based on the counter value of the counter module 210 compared to a threshold.

In addition, the server 200 may also include data storage 212. Data storage 212 may include volatile or non-volatile types of memory and may be configured with different types of mutability. In one implementation, the data storage 212 may store program logic 214 executable by the processor 208. The data storage 212 may also store reference data 216 that may be used to generate or determine grammars and/or modifications to the grammars. Other examples may exist as well.

The server 200 may be configured to access the reference data 216 upon receiving an input from a client device. The reference data 216 may include one or more data logs 218 received from one or more client devices. In some examples, the one or more data logs 218 may include the counter value of the counter module 210. The one or more data logs 218 may comprise one or more recordings of spoken queries. The recordings of spoken queries may be captured by one or more devices from one or more users.

The communication link 220 is illustrated as a wired connection; however, wireless connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

Figure 3:
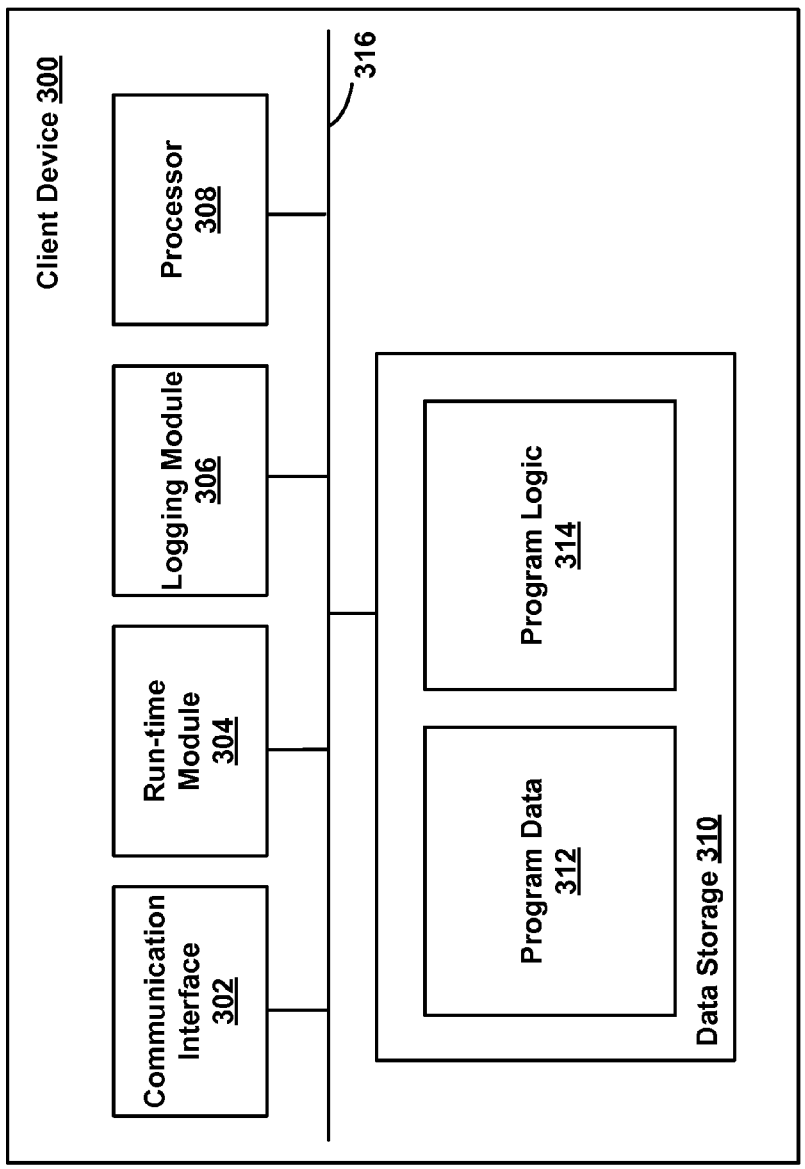
FIG. 3 illustrates a schematic drawing of another example computing device.

FIG. 3 illustrates a schematic drawing of another example computing device 300. In the example of FIG. 3, the computing device takes a form of a client device 300. Other example schematic drawings may exist as well. In some examples, some components of client device 300 illustrated in FIG. 3 may be distributed across multiple computing devices. However, for the sake of example, the components are shown and described as part of one example client device 300. In addition, the client device 300 may be a mobile device, desktop computer, email/messaging device, tablet computer, wearable computing device, or similar device that may be configured to perform the functions described herein.

In the example illustrated by FIG. 3, the client device 300 may include a communication interface 302, a run-time module 304, a logging module 306, a processor 308, and data storage 310. Data storage 310 may comprise program data 312 and program logic 314. In addition, all or some of the components illustrated in FIG. 3 may be linked together by a communication link 316. The client device 300 may also include various hardware components to enable communication within the client device 300 and between the client device 300 and another computing device (not shown), such as a server entity. For example, the client device 300 may use hardware such as transmitters, receivers, and antennas, for example.

The client device 300 may be configured with the communication interface 302, which may allow the client device 300 to communicate with another computing device (not shown), such as server 200. In addition, the communication interface 302 may be configured to receive input data from one or more computing devices, and may also be configured to send output data to the one or more computing devices. In some examples, the communication interface 302 may also maintain and manage records of data received/sent by the client device 300. In other examples, records of data may be maintained and managed by other components of the client device 300.

The client device 300 may also be configured to include the run-time module 304, which may be configured to perform grammar-based textual pattern matching utilizing grammars which may be provided by the server. In some examples, the run-time module 304 may be configured to perform speech/text recognition functions locally at the client device 300, in a similar manner as the speech recognition module 204 described in FIG. 2. In another example, the run-time module 304 may be configured to receive a textual input (also referred to as an input instruction) from a separate module configured to convert a verbal input into the textual input. It should be understood, that the functions performed by the run-time module 304 may be divided between the client device 300 and one or more servers in a particular network.

In some examples, the run-time module 304 may utilize a given grammar in order to parse a textual input. By parsing the textual input, the run-time module 304 may perform argument identification along with pattern classification. Argument identification may include assigning one or more arguments to one or more portions of the given textual input. Pattern classification may include assigning a function to perform to a given textual input. The parsing of a textual input may take various forms, and several examples will be described in later figures.

The run-time module 304 may perform grammar-based/rule-based textual pattern matching using a variety of techniques, such as by use of finite state machines, algorithms, or other techniques known by those having ordinary skill in the art. In some examples, the run-time module may be configured to perform speech recognition as well.

After parsing the textual input, the run-time module 304 may send an output comprising a record of the textual input and the result of the parsing of the textual input to the logging module 306 that is configured to store the output received from the run-time module 304. The logging module 306 may also be configured to store one or more portions of the textual input, including any portion that may not have been successfully parsed due to one or more incorrect grammars. In some examples, the logging module 306 may store data locally at the client device 300. In other examples, the logging module 306 may store data remotely at another computing device. The logging module 306 may then send data to the server to be processed so as to update grammars associated with the textual input. Modifications may be made to an incorrect grammar when an unsuccessful parsing occurs due to the incorrect grammar. The logging module 306 may store and organize the data received from the run-time module 304. The data storage 310 may store program data 312 and program logic 314 that can be accessed and executed by the processor 308. The data storage 310 may also store grammars utilized by the run-time module 304.

The communication link 316 is illustrated as a wired connection; however, wireless connections may also be used. For example, the communication link 316 may be a wired serial bus such as a universal serial bus or a parallel bus.

Figure 4A:
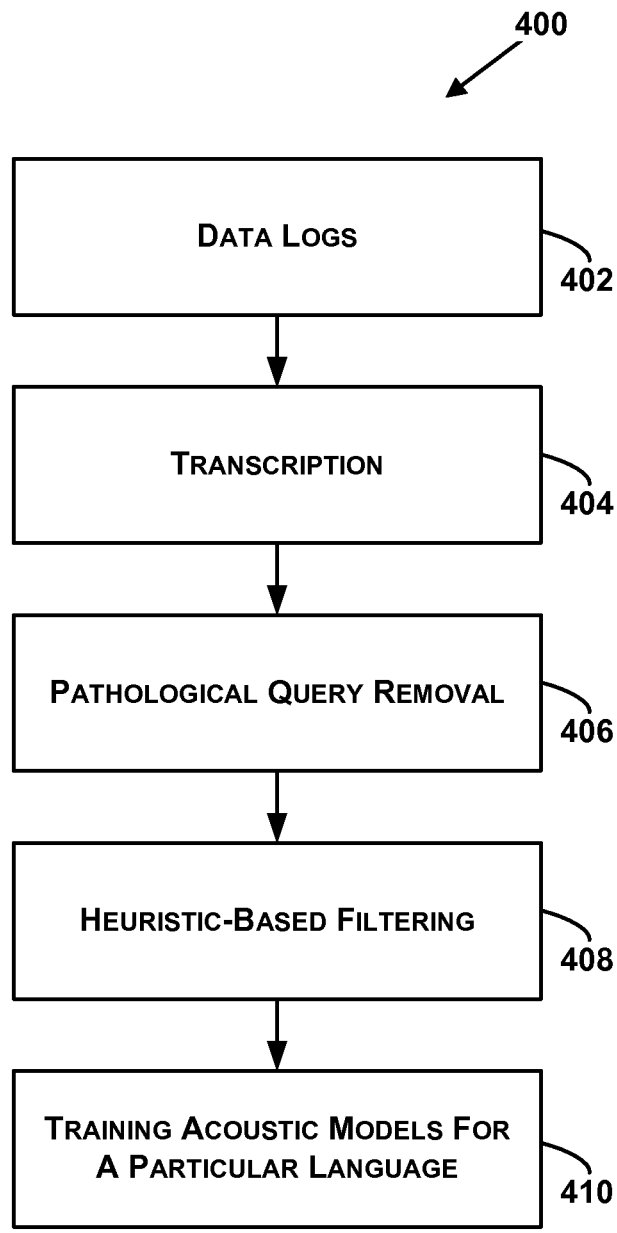

FIG. 4A illustrates a flow chart 400 of example conceptual aspects for performing methods herein. The flowchart 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the flowchart 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the flowchart 400 shown in FIG. 4A will be described as implemented by a server in communication with a client device. It should be understood that other entities can implement one or more steps of the example method.

The flowchart 400 illustrates high level functions, and may be defined in greater detail in various ways. At block 402, the flowchart 400 comprises data logs. The data logs may represent a device configured to capture one or more recordings of spoken queries and store the recordings within a data log. A device may receive one or more data logs from another device. In some instances, a device may be configured to comprise a plurality of data logs.

At block 404, the flowchart 400 further comprises transcription. One or more devices may be configured to transcribe the recordings within one or more received data logs. For example, a speech recognition module may use one or more algorithms to determine transcriptions for each recording of spoken query. A device may be configured to transcribe the one or more data logs into a computer-usable format for each recording through various means, such as comparisons with modified data logs or previously determined correct transcriptions. Other examples of transcription may exist as well.

At block 406, the flowchart 400 further includes pathological query removal. A device may be configured to identify transcriptions indicative of pathological queries and remove them from the modified data log. A pathological query may be one in which the recording in the data log includes noise (e.g., wind), and thus, the transcription is nonsensical, such as resulting in a transcription of "TTTT". In one such instance, a device may determine the frequency of occurrence of transcriptions in order to identify the transcriptions with unusually high levels of occurrence. The device may be configured to determine the transcriptions indicative of noise and remove those transcriptions based on a frequency of occurrence.

At block 408, the flowchart 400 also comprises heuristic-based filtering. A device may further filter a modified data log after removing any transcriptions of pathological queries by using heuristic-based filtering. For instance, a device may use algorithms with various rule-based parameters to remove additional transcriptions that may not be wanted on a modified data log used for a set of training. A device may be configured to apply multiple rule-based parameters to one data log simultaneously.

At block 410, the flowchart 400 comprises training acoustic models for particular languages. A device may contain a modified data log at this point that may be used as a set for training acoustic models for particular languages. The modified data log may be comprised of transcriptions that the device did not remove for being a pathological query or through heuristic-based filtering. In some examples, the device may be configured to remove any data logs. A modified data log may be used in various ways by an acoustic model for a particular language in order to increase accuracy.

In some examples, a device may execute functions of the flowchart 400 in a different order or choose to repeat one or more blocks during the execution of the flowchart 400. For example, a device may perform block 404 multiple times to transcribe a modified log to a greater degree of accuracy. In addition, a device may skip any block during the execution of flowchart 400.

FIG. 4B depicts a flow chart of an example method. Method 412 may include one or more operations, functions, or actions as illustrated by one or more of blocks 414-426. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 412 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 412 shown in FIG. 4B will be described as implemented by a server in communication with a client device. It should be understood that other entities can implement one or more steps of the example method.

At block 414, the method 412 includes receiving data logs with at least one or more recordings of spoken queries. A system including one or more devices, such as the devices discussed in FIGS. 2-3, may receive one or more data logs. Similarly, multiple entities may receive/transfer data logs within a system, such as the example system discussed in FIG. 1. The one or more data logs may contain a variety of recordings of spoken queries. The data logs and the recordings may be stored within one or more devices in various types of memory including volatile or non-volatile memory. In some examples, the data logs may be accessible by only the device storing the data logs, or may be accessible to other devices based on permission with the device.

Further, the recordings of spoken queries within a data log may be composed of recorded utterances and/or pauses and may be captured by one or more devices, for example. One or more utterances may formulate into a group or may be subdivided in various ways, such as into one or more phoneme(s). A phoneme is a small segmental unit of sound employed to form meaningful contrasts between utterances. In addition, a recording of spoken queries may include portions of a word, full words, a phrase, an entire sentence, or even multiple sentences. Besides utterances, a recording of spoken queries may also include noise or other non-linguistic elements, such as wind or background noise. For example, a device capturing input from a user may also capture background noise. Captured noise may be stored within a data log in the same manner a spoken input and may also closely resemble the spoken utterances in some cases. Although some captured noise may not affect a speech recognition system, sometimes transcriptions of the captured noise may have an impact on the efficiency and accuracy of the speech recognition system. Thus, a device may attempt to remove any transcriptions determined to be a result of captured noise.

At block 416, the method 412 includes transcribing the recordings of spoken queries. Transcribing the recordings of spoken queries may involve a device within a system determining the textual transcriptions for each recording of spoken queries. For example, a speech recognition module may receive the one or more data logs containing recordings of spoken queries and transcribe the recordings into a computer-readable format. In some instances, a speech recognition module may match text sting transcriptions to each utterance in a data log based on a statistical distribution. Similarly, a device may use pattern matching to determine transcriptions for each recording. In addition, a speech recognition system may use transcriptions in a manner so as to improve acoustic models and determine one or more differences between noise and speech. Other devices may be configured to use the data logs and transcribe the recordings of spoken queries. For example, an outside module associated with a device, such as a server, may be configured to transcribe the recordings into a useable format for a computing device.

The device may be configured to transcribe received recordings in real-time. In some examples, the speech recognition module may use additional time to transcribe one or more spoken queries rather than transcribing in real-time. For example, a device may be configured to transcribe the recordings of spoken queries in real-time, but a server with a speech recognition module as shown in FIG. 1 may be configured to transcribe at a slower rate. A user may use "voice controls" to operate a mobile phone and expect quick transcriptions from the mobile. In contrast, in situations that permit more time for transcribing, a speech recognition module may be configured to provide transcriptions at a slower speed using more computationally complex methods. In some examples, a device may transcribe one or more recordings of spoken queries more than once to verify accurate transcriptions At block 418, the method 412 includes identifying within transcriptions of the recordings of spoken queries having an occurrence exceeding a threshold based on a comparison of the transcriptions with previous transcribed queries. One or more devices may be configured to track the number of occurrences for certain recordings of spoken queries are transcribed. The speech recognition system may use a counter that may be located internally or externally, to determine the number of times various transcriptions may occur. In addition, one or more algorithms may be configured to determine statistics based on the frequency of occurrence of transcriptions. A speech recognition module may be configured to define the threshold amount or compute a different way of determining selected transcriptions with a certain amount of occurrence. Other examples of determining that transcriptions of the recordings of spoken queries having an occurrence exceeding a threshold may exist as well.

At block 420, the method 412 includes processing recordings of spoken queries corresponding to the identified transcriptions using both a language model and an acoustic model. One or more entities, such as a speech recognition module, may process the recordings of spoken queries corresponding to the identified transcriptions. Different entities or the same entity may process the recordings of spoken queries using both a language model and an acoustic model. The language and acoustic models work in tandem during decoding.

While decoding, a device may be configured to use a language model to process the recordings of spoken queries. The language model may be configured to assign a probability to one or more spoken queries based on one or more algorithms, such as a probability distribution. A device may be configured to use a language model to capture various properties of the spoken queries and may be used to predict additional words in the sequence. The language model may be configured to assist the speech recognition module to determine the probability of word sequences.

In addition, a system may be configured to process the recordings of spoken queries using an acoustic model along with the language model. A system may process the recordings using an acoustic model at the same time as the language model in order to execute decoding. In addition, a system may be configured to use other types of models to process the recordings of spoken queries. Other examples of processing the transcriptions may exist as well.

In some instances, an acoustic model may be configured to compile the recordings of spoken queries with their matching transcriptions into one or more statistical representations that give a probability of a given time slice of audio matching a particular phoneme. In some instances, an acoustic model may be configured to estimate the various phoneme(s) of utterances in the recordings of spoken queries by comparing each phoneme within the recordings to the stored distributions for all the possible phonemes. A device may use one or more different phonemic alphabets, and these alphabets may have different textual representations for the various phonemes therein. For example, the letter "a" may be represented by the phoneme /ae/ for the sound in "cat," by the phoneme /ey/ for the sound in "ate," and by the phoneme /ah/ for the sound in "beta." Other phonemic representations are possible. Common phonemic alphabets for American English contain about 40 distinct phonemes. By matching phonemes of utterances, an acoustic model may determine a computer readable format from the one or more recordings of spoken queries. The results of an acoustic model may be used to determine and/or check the accuracy of the various transcriptions of the recordings of spoken queries.

A language model is a statistical model that may give a probability of a given word sequence in the target language through the use of a probability distribution. Each word sequence may vary in length. In such instances, a language model may contain and apply the probabilities of sequences of words in comparisons. A language model may be trained by analyzing a large number of words, e.g., hundreds, thousands, millions or more. The words may be derived from utterances recorded from users and/or from written documents. For instance, a language model may be determined or developed based on word patterns occurring in human speech, written text (e.g., emails, web pages, reports, academic papers, word processing documents, etc.), search queries, and so on. In some examples, the language model may be used to capture the properties of a language and/or used to predict the next word in a speech sequence. In some instances, a language model may be used by a device to determine probabilities that a transcription is accurate based on the probability distribution of the language model. In one such example, a language model may assign lower probabilities to transcriptions that occur rarely.

At block 422, the method 412 includes based on a comparison of the processing using the language model with the processing using the acoustic model, identifying, from the one or more data logs, recordings of spoken queries corresponding to transcriptions deemed to be due to noise and a remainder of the recordings of spoken queries. A system may be configured to compare the results of processing the recordings of spoken queries with the language model and the acoustic model. For example, a device may use the statistical representations compiled by the acoustic model and compare these statistics with the probabilities determined by a language model. The models may determine which transcriptions are accurate based on probabilities and the transcriptions that may be indicative of noise based on low probabilities and/or statistics. The system may compare one or more factors of the results. Some factors used to determine wanted transcriptions may have higher priority levels. In addition, a device may compare transcriptions for given recordings of spoken queries with the probabilities determined by the language model and/or the statistical representations compiled by the acoustic model. In instances where the transcriptions do not accurately match the likely probability or statistics produced by the language and acoustic models, a device may determine that the transcription may be indicative of noise. Based on the one or more comparisons, a system may be configured to remove transcriptions of recordings of spoken queries that the system deemed to be a result of noise.

The remainder of the recordings of spoken queries may include any recordings that the language model and acoustic model do not cause the device to identify as noise. In other examples, the remainder of the recordings of spoken queries may be the recordings of spoken queries that the device did not identify as corresponding to transcriptions deemed to be due to noise. Similarly, the remainder of the recordings of spoken queries may represent transcriptions that the device has deemed valuable or useful to use within modified data logs for training data sets.

Furthermore, a system may determine whether a transcription may be indicative of noise in various other ways. For example, a system may determine that a transcription is a result of capturing noise based on comparisons with prior transcriptions determined to be accurate transcriptions. A system may use training data to determine the accuracy of recently created transcriptions through the use of previously generated modified logs that have already removed unwanted transcriptions. A device may determine that unwanted transcriptions may be indicative of pathological queries and remove the unwanted transcriptions in response. A pathological query may be one or more transcriptions that has an unusually high occurrence level and is a result of noise.

At block 424, the method 412 further comprises generating one or more modified data logs including the remainder of the recordings of spoken queries. The generation of the modified data logs by the device may include the device removing unwanted data logs or simply combining wanted data logs into the modified logs. The device may use the remainder of the recordings of spoken queries to generate the modified data logs. In some examples, a device may compile data logs deemed to not contain noise from a server or other devices and compose them together to create one or more modified data logs. Further, the device may use some of the remainder of the recordings of the spoken queries to generate modified logs. Some modified logs may contain different portions of the remainder of the recordings of spoken queries, for example. Similarly, the device may be configured to generate multiple modified data logs and divide recordings of spoken queries among the modified data logs. In some examples, the generated data logs may not contain recordings corresponding to transcriptions deemed to be due to noise as identified above.

Other examples of generating modified data logs containing recordings of spoken queries may exist as well.

At block 426, the method 412 includes providing the modified data logs and associated transcriptions of the recordings of spoken queries within the modified data logs as a training data set to update acoustic models for particular languages. The modified data logs may be provided by the device to one or more acoustic models for particular languages for training. An acoustic model for a particular language may be configured to use training data sets. In another example, one or more servers may be configured to provide the modified data logs. An acoustic model for a particular language may use more than one set of modified data logs to update the speech recognition system. Further, the updates may occur constantly in real-time and in the background while a device is operating. The one or more modified data logs may update the vocabulary that a speech recognition system may use to compare received spoken queries with. The updated vocabulary may contain all the words in any active grammars. Other examples may exist as well.

In some examples, a device may perform method 412 through the use of a speech recognition module with a speech recognizer to determine any wanted audio input from unwanted noise. For example, a speech recognition module may be configured to detect the differences between noise and wanted utterances from a user by comparing current transcriptions with previous modified training log sets. Further, a device may also be configured to detect shifts and/or changes in vocal quality within a recording of spoken queries. Detecting shifts and/or changes in vocal quality may allow a device to further detect differences between utterances and noise.

While performing method 412, a speech recognition module may be configured to transcribe received data logs to determine the transcription for each utterance received. In some examples, one or more devices may be configured to determine a confidence score based on the match of the transcription with a transcription stored within the device. For example, a confidence score may relate to the probability that the transcription correctly matches an utterance. The confidence score may also be determined by a device through a comparison of current transcriptions with correct transcriptions stored in memory. One or more confidence scores may be determined based on various parameters throughout executing the blocks of method 412. Other methods or examples for determining confidence scores for transcriptions may exist as well.

A device may be configured to select utterances in a multiple step process. One such step may involve a device checking all the data logs available for the speech recognition system for appropriate transcriptions. For example, a device may scan many utterances within the data logs. Consequently, a device may filter all the data logs that are below a certain confidence threshold. A confidence may be determined by the device for each transcription indicating an estimated likelihood that the transcription is correct (e.g., 80% confidence, 90% confidence, etc.). In one such example, the confidence may be determined by a device assigning scores to each transcription based on a scale of 0 to 1 with 0 representing no confidence and 1 representing complete confidence in the transcription. In the example, the device may reject anything that falls below a threshold level of 0.85 or another predetermined threshold level. In an additional filtering step, a computing device may sort utterances by confidence and keep the top N utterances, where N is a variable that represents a predefined number that may be changed according to desired results. The value of N may represent the data set size needed to train a good quality model. For example, a system may select N to equate to roughly 2 million.

In one such example of transcription, a computing device may be configured to train a logistic regression function on a single-dimensional input that may determine the transcriptions for recordings of spoken queries. The logistic regression function on a single-dimensional input may further assist the computing device in determining good matches between current transcripts and hypothetical transcripts from past transcriptions. In response to determining a good match between a hypothesis and a transcript, a device may assign a higher confidence score to the correct hypothesis and lower confidence scores to incorrect or unused hypotheses. In the case that the algorithm determines the comparison yields a poor match between the hypothesis transcription and a transcription for a spoken query, there may be other hypotheses that match the audio almost as well as the one selected.

In some further examples, a speech recognizer within a speech recognition module may be configured to consider the context around the recordings of speech queries. The speech recognition module that is transcribing at a slower, more accurate pace may be able to use the context around the recordings of speech queries in a more efficient manner than a speech recognition module that is required to provide transcriptions within immediate time constraints. Thus, a system without time constraints may take ample amounts of more time to improve accuracy of the transcriptions of recordings. In some examples, a speech recognition module may use decoding, which controls how many alternative hypotheses are considered as transcripts for the received recordings of spoken queries. The speech recognition module may be configured to adjust one or more parameters of decoding, such as the beam, the maximum number of arcs, or the number of Gaussian selection centroids, for example.

In one example, a device using acoustic models for particular languages may include a hidden Markov model (HMM). An HMM may model a system as a Markov process with unobserved (i.e., hidden) states. Each HMM state may be represented as a multivariate Gaussian distribution that characterizes the statistical behavior of the state. Additionally, each state may also be associated with one or more state transitions that specify a probability of making a transition from a current state to another state. In addition, a neural network may also represent a multivariate Gaussian distribution.

Additionally, an entity performing the method 412 may increase the scope of search performed for previous transcriptions based on the received recognized speech queries. The scope may be increased through multiple transcriptions of the recordings of spoken queries through the use of additional parameters. By increasing the overall scope of search of previous transcribed utterances, the entity may transcribe the recordings of spoken queries with a greater focus on details, thus improving accuracy. Similarly, more complex and advanced speech recognizers may be used to increase the degree of accuracy of the transcriptions. For example, a speech recognition module may be configured to operate as a neural network based recognizer. A neural network may be configured to allow discriminative training in a natural and efficient manner, such as classifying short-time units such as individual phonemes and isolated words.

Furthermore, since the one or more spoken queries are recorded and placed within data logs, the transcription process may not have restrictions from any CPU, memory, storage, or other possible restrictions. Without the restrictions, a complex system may be configured to transcribe and re-transcribe any audio. In some examples, more than one system may execute cooperatively to transcribe the recordings of spoken queries.

In an additional example of transcription, a device may further break down the spoken queries of the data logs into various utterances to use for transcription. One or more devices may be configured to recognize the transcriptions and determine the more accurate transcriptions. A computing device may be configured to use a speech recognizer to select the best transcriptions in its model for a given audio input. Other examples and methods of transcription may exist as well.

In one instance, a system may be configured to further filter one or more data logs based on heuristic-based filtering. Heuristic-based filtering involves one or more entities of the system applying one or more rule-based parameters to the data logs. The system may be configured to execute heuristic-based filtering throughout method 412 or may wait until the data logs are each in a modified data log form. When applying rule-based parameters, a system may be configured to apply multiple rule-based parameters sequentially or simultaneously. The system may also be configured to use combinations of the rule-based parameters or set some of the rule-based parameters with a higher priority level. As discussed above, a system may be configured to determine confidence scores based on the transcriptions and remove any transcription that the system determines to not surpass a threshold confidence level. A system may further determine another threshold level that is high that the system may require the confidence score of a transcription to surpass.

In addition, a system may be configured to determine the length of a spoken query in a recording and remove the recording if the system determines that the recording does not meet a threshold length requirement. In some examples, the system may be configured to remove transcriptions that do not meet a threshold length requirement. A system may be able to determine higher confidence scores based on longer recordings of spoken queries since the system may have more acoustic evidence from the according to base a decision on.

Further, a system may be configured to further filter one or more data logs by removing or rejecting any recording of spoken queries containing numerical sequences. In some examples, a system may be configured to transcribe the recordings of spoken queries containing numerical sequences and execute the transcription properly, but choose to remove the transcription from the modified data logs used for training acoustic models for particular languages. In addition, a system may be configured to remove any transcription containing a URL from the modified logs used for training.

A system may also be configured to only accept a predefined amount of input from any given application so as to not have the modified data logs biased towards a single application. Similarly, a system and/or device may be configured to limit the amount of data logs received based on biological information related to the user. For example, a system may be configured to receive a threshold amount of data logs from users that the device determined to be from male users and a threshold amount from female users.

Furthermore, a system compiling modified data logs for training may be configured to determine accuracy of transcriptions based on the actions of a user. A system may be configured to identify if a user accepts a transcription as provided by the speech recognition module of the system. For example, a system may determine a high confidence score for a transcription after a user expressively accepts the form by performing an action. The high confidence score may cause the system to use that particular transcription in a modified data log for training.

Figure 5:
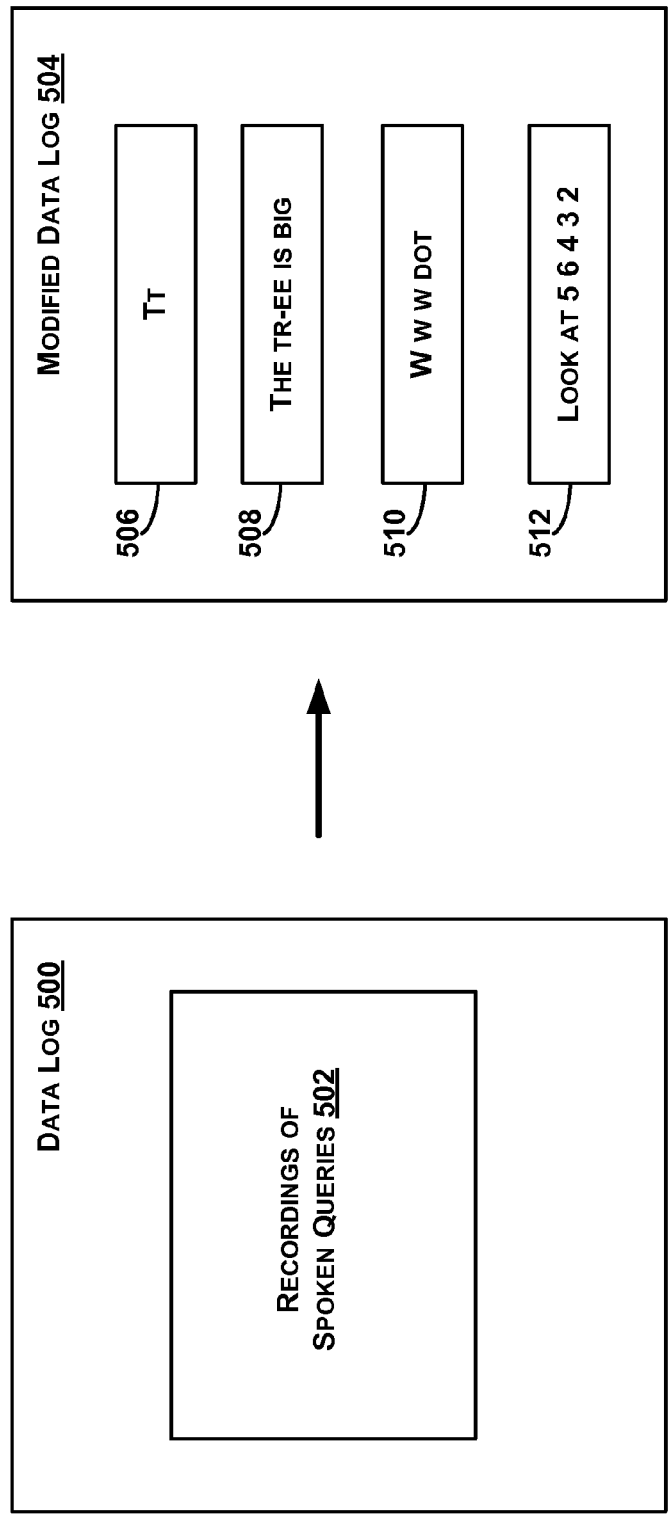
FIG. 5 illustrates an example for a data log containing recordings of spoken queries being modified into a modified data log containing transcriptions of the spoken queries.

FIG. 5 illustrates an example for a data log containing recordings of spoken queries being modified into a modified data log containing transcriptions of the spoken queries. In the example, a device, such as a computing device with a speech recognition module, may store data log 500 in memory. In addition, the device may be configured to transcribe the recordings of spoken queries 502 within data log 500 in order to create modified data log 504 that may be used as a training data set to update one or more acoustic models for particular languages. The example illustrated by FIG. 5 shows modified data log 504 containing transcriptions 506-512. The example illustrated by FIG. 5 may be performed by one or more devices in addition to executing method 412.

A device, or a component of a device, such as a speech recognition module, may access data log 500 and transcribe one or more recordings of spoken queries 502 located within data log 500. The same device may have captured the recordings of spoken queries 502 or may have received the data log 500 from another device.

FIG. 5 shows the modified data log 504 comprising four different transcriptions 506-512. In other examples, the modified data log 504 may comprise a different number of transcriptions. The number may depend on the number of recordings of spoken queries that the modified log receives transcriptions from. In another example of a modified log, there may be a far greater number of transcriptions. The transcriptions 506-512 located in modified data log 504 represent example transcriptions that a modified data log 504 may use to train acoustic models for particular languages. In some examples, a device may use comparisons to remove one or more of the transcriptions from the modified data log to improve the accuracy.

In one such instance, a device may be configured to remove transcription 506 "Tt" by performing method 412 that causes the device to determine that "Tt" is indicative of noise and not a wanted input from a user. In some examples, a speech recognition module within the device may perform method 412 and determine that transcription 506 has a high occurrence that exceeds a predefined threshold amount and thus, choose to remove the transcription 506 based on the abnormally high amount of occurrences for an unusual transcription. In such an instance, the device may have captured a recording from noise or some other unwanted sound and transcribed the recording into transcription 506. The transcription 506 may not be wanted in a modified data log used for training acoustic model, causing a device to use various means to identify and remove transcription 506, such as heuristic-based filtering. Similarly, a device may determine that transcription 506 should remain in the modified data log 504 to be used for training.

In addition, a device may be configured to transcribe data log 500 more than once. For example, the device may transcribe the recordings of spoken queries 502 and re-transcribe the recordings of spoken queries 502 an additional time with more accurate filter rules. A device may apply multiple rule-based parameters to the transcriptions to determine whether to remove a transcription or keep the transcription for the modified data log.

Similarly, the example illustrated in FIG. 5 shows modified data log 504 further comprising transcription 508. The transcription 508 is written text for a record spoken query of "The tr-ee is big." A device may be configured to determine whether to keep or remove transcription 508. In one example, the device may determine that transcription 508 is a proper transcription and use the transcription in one or more modified logs to train acoustic models for particular languages. Conversely, the system may choose to remove transcription 508 if the system determines a confidence score that does not exceed a desired threshold or the length of the transcription does not meet or surpass a desired length. Furthermore, the transcription 508 may be kept or removed by a speech recognition module for other reasons.

Additionally, the modified data log 504 may further comprise transcriptions 510 and transcription 512. A device may determine that transcription 510 contains a URL and choose to remove transcription 510 from being used in a modified version of data log 500. In other examples, the device may choose to keep transcription 510. Likewise, the computing device may be configured to perform device action to remove the transcription 512 "Look at 5 6 4 3 2", since the transcription 512 contains a numerical sequences. In contrast, the device may choose to keep the transcription 512 in the modified data log 504. As such, the examples shown in FIG. 5 are merely illustrative. A device may be configured to apply other rule-based parameters to a data log to remove one or more transcriptions deemed to be unwanted by the system for modified data logs for training acoustic models for particular languages. In some of the examples, the composed modified logs may not require the device to remove any unwanted transcriptions.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:
1. A method, comprising:
 receiving one or more data logs, wherein the one or more data logs comprise at least one or more recordings of spoken queries;
 transcribing the one or more recordings of spoken queries;
 identifying within transcriptions of the one or more recordings of spoken queries transcriptions having an occurrence exceeding a threshold, wherein the threshold is based on a comparison of the transcriptions with previous transcribed queries;
 processing, by a computing device, recordings of spoken queries corresponding to the identified transcriptions using both a language model and an acoustic model;
 based on a comparison of the processing using the language model with the processing using the acoustic model, identifying, from the one or more data logs, one or more recordings of spoken queries corresponding to transcriptions deemed to be due to noise and a remainder of the one or more recordings of spoken queries;

generating one or more modified data logs including the remainder of the recordings of spoken queries; and providing the one or more modified data logs and associated transcriptions of the one or more recordings of spoken queries within the one or more modified data logs as a training data set to update one or more acoustic models for particular languages.

2. The method of claim 1, further comprising:

determining a confidence score based on processing recordings of spoken queries corresponding to the identified transcriptions using both a language model and an acoustic model; and removing from the one or more data logs given recordings of spoken queries based on the confidence score.

3. The method of claim 1, further comprising identifying the transcriptions based also on a length of the transcriptions.

4. The method of claim 1, further comprising removing one or more transcriptions of the one or more recordings of spoken queries that include one or more numerical sequences.

5. The method of claim 1, further comprising removing transcriptions comprising a uniform resource locator (URL).

6. The method of claim 1, wherein receiving one or more data logs further comprises receiving up to a threshold amount of data logs from one or more applications.

7. The method of claim 1, wherein receiving one or more data logs further comprises receiving an amount of speech queries based on a gender of a user.

8. A computer readable medium having stored therein instructions, that when executed by a computing device, cause the computing device to perform functions comprising:

receiving one or more data logs, wherein the one or more data logs comprise at least one or more recordings of spoken queries;

transcribing the one or more recordings of spoken queries;

identifying within transcriptions of the one or more recordings of spoken queries transcriptions having an occurrence exceeding a threshold, wherein the threshold is based on a comparison of the transcriptions with previous transcribed queries;

processing recordings of spoken queries corresponding to the identified transcriptions using both a language model and an acoustic model;

based on a comparison of the processing using the language model with the processing using the acoustic model, identifying, from the one or more data logs, one or more recordings of spoken queries corresponding to transcriptions deemed to be due to noise and a remainder of the one or more recordings of spoken queries;

generating one or more modified data logs including the remainder of the recordings of spoken queries; and providing the one or more modified data logs and associated transcriptions of the one or more recordings of spoken queries within the one or more modified data logs as a training data set to update one or more acoustic models for particular languages.

9. The computer readable medium of claim 8, wherein the functions further comprise:

determining a confidence score based on processing recordings of spoken queries corresponding to the identified transcriptions using both a language model and an acoustic model; and removing from the one or more data logs given recordings of spoken queries based on the confidence score.

10. The computer readable medium of claim 8, wherein the functions further comprise identifying the transcriptions based also on a length of the transcriptions.

11. The computer readable medium of claim 8, wherein the functions further comprise removing one or more transcriptions of the one or more recordings of spoken queries containing one or more numerical sequences.

12. The computer readable medium of claim 8, wherein the functions further comprise removing transcriptions comprising a uniform resource locator (URL).

13. The computer readable medium of claim 8, wherein the function of receiving one or more data logs further comprises receiving up to a threshold amount of data logs from one or more applications.

14. The computer readable medium of claim 8, wherein the functions further comprise receiving an amount of speech queries based on a gender of a user.

15. A system, comprising:

at least one processor; and data storage comprising program instructions executable by the at least one processor to cause the at least one processor to perform functions comprising:

receiving one or more data logs, wherein the one or more data logs comprise at least one or more recordings of spoken queries;

transcribing the one or more recordings of spoken queries;

identifying within transcriptions of the one or more recordings of spoken queries transcriptions having an occurrence exceeding a threshold, wherein the threshold is based on a comparison of the transcriptions with previous transcribed queries;

processing recordings of spoken queries corresponding to the identified transcriptions using both a language model and an acoustic model;

based on a comparison of the processing using the language model with the processing using the acoustic model, identifying, from the one or more data logs, one or more recordings of spoken queries corresponding to transcriptions deemed to be due to noise and a remainder of the one or more recordings of spoken queries;

generating one or more modified data logs including the remainder of the recordings of spoken queries; and providing the one or more modified data logs and associated transcriptions of the one or more recordings of spoken queries within the one or more modified data logs as a training data set to update one or more acoustic models for particular languages.

16. The system of claim 15, wherein the functions further comprise:

determining a confidence score based on processing recordings of spoken queries corresponding to the identified transcriptions using both a language model and an acoustic model; and removing from the one or more data logs given recordings of spoken queries based on the confidence score.

17. The system of claim 15, wherein the functions further comprise identifying the transcriptions based also on a length of the transcriptions.

18. The system of claim 15, wherein the functions further comprise removing one or more transcriptions of the one or more recordings of spoken queries that include one or more numerical sequences.

19. The system of claim 15, wherein the functions further comprise removing transcriptions comprising a uniform resource locator (URL).

20. The system of claim 15, wherein the functions further comprise receiving up to a threshold amount of data logs from one or more applications.

* * * * *